US012485562B2

(12) United States Patent
Guan

(10) Patent No.: US 12,485,562 B2
(45) Date of Patent: Dec. 2, 2025

(54) LOCKING BLADE DEVICE

(71) Applicant: Zeluo Guan, Yangjiang (CN)

(72) Inventor: Zeluo Guan, Yangjiang (CN)

( * ) Notice: Subject to any disclaimer, the term of this patent is extended or adjusted under 35 U.S.C. 154(b) by 157 days.

(21) Appl. No.: 18/513,761

(22) Filed: Nov. 20, 2023

(65) Prior Publication Data

US 2024/0375301 A1 Nov. 14, 2024

(30) Foreign Application Priority Data

May 8, 2023 (CN) ......................... 202321085126.4

(51) Int. Cl.
*B26B 1/08* (2006.01)
*B26B 1/10* (2006.01)

(52) U.S. Cl.
CPC . *B26B 1/08* (2013.01); *B26B 1/10* (2013.01)

(58) Field of Classification Search
CPC .................................... B26B 1/08; B26B 1/10
USPC ............................................................ 30/162
See application file for complete search history.

(56) References Cited

U.S. PATENT DOCUMENTS 8,595,941 B2 * 12/2013 Lee .......................... B26B 1/08
30/162

FOREIGN PATENT DOCUMENTS

FR 1009036 A * 1/1950

* cited by examiner

*Primary Examiner* — Nhat Chieu Q Do
(74) *Attorney, Agent, or Firm* — WPAT, PC

(57) ABSTRACT

A locking blade device is provided, which includes a knife sleeve and mechanical claws disposed on two sides of an end of the knife sleeve. An end of each of the mechanical claws is hinged with the knife sleeve. A blade is slidably disposed in the knife sleeve. Two sides of the blade are provided with locking grooves. The other end of each of the mechanical claws is provided with a clamping end head configured to clamp into a corresponding one of the locking grooves. A push button is slidably disposed on the knife sleeve and is movably connected to the mechanical claws, and the push button is configured to make the clamping end head be clamped into the corresponding one of the locking grooves. The knife sleeve includes an upper cover, a lower cover, and a fixing frame disposed between the upper cover and the lower cover.

6 Claims, 5 Drawing Sheets

LOCKING BLADE DEVICE

CROSS-REFERENCE TO RELATED APPLICATION

This application claims the priority of Chinese Patent Application No. 202321085126.4, filed on May 8, 2023, which is herein incorporated by reference in its entirety.

TECHNICAL FIELD

The disclosure relates to the technical field of knives, and particularly to a novel locking blade device.

BACKGROUND

For flail knives, straight jump knives, and other knives with retractable blades, when a blade extends out of a knife handle for puncture operations, there is a risk of the blade retracting back into a knife sleeve. When a knife is used to perform cutting operations, the knife edge shakes left and right, which is not safe enough for a user. Therefore, a novel locking blade device is provided.

SUMMARY

In order to overcome the shortcomings of the prior art, the disclosure provides a novel locking blade device. Compared with flail knives, straight jump knives, and other knives with retractable blades, the locking blade device of the disclosure can effectively improve the stability of the blade when extended and ensure that the blade will not retract into a knife sleeve during use.

In order to solve the above technical problems, the disclosure provides the following technical solution.

A locking blade device is provided, which includes a knife sleeve and mechanical claws disposed on two sides of an end of the knife sleeve. An end of each of the mechanical claws is hinged with the knife sleeve, a blade is slidably disposed in the knife sleeve, two sides of the blade are provided with locking grooves, the other end of each of the mechanical claws is provided with a clamping end head configured to clamp into a corresponding one of the locking grooves, a push button is slidably disposed on the knife sleeve and is movably connected to the mechanical claws, and the push button is configured to make the clamping end head be clamped into the corresponding one of the locking grooves.

In an embodiment, the knife sleeve includes an upper cover, a lower cover, and a fixing frame disposed between the upper cover and the lower cover. The upper cover is provided with a push button movable slot, and the push button movable slot is configured to limit movements of the push button.

In an embodiment, a guide plate is slidably disposed on the fixing frame, the push button is fixed at an end of the guide plate, a connecting ear structure is provided at the end of the guide plate, side sliding slots are provided on the fixing frame and located below the connecting ear structure, and the connecting ear structure is provided with inserting holes penetrating the connecting ear structure. Sliding rods are slidably disposed in the side sliding slots respectively, and the sliding rods are fixed in the inserting holes respectively. The mechanical claws are provided with inclined sliding slots inclined towards the push button, each of the sliding rods passes through a corresponding one of the inclined sliding slots, and each of the sliding rods is slidably connected to the corresponding one of the inclined sliding slots.

In an embodiment, a limited sliding slot is provided on the fixing frame, and another end of the guide plate is slidably disposed in the limited sliding slot.

In an embodiment, a side of the fixing frame facing away from the guide plate is provided with a storage groove, and the storage groove is configured to accommodate the blade.

In an embodiment, other two sides of the blade are fixedly provided with limited sliding blocks. The storage groove is provided with a top sliding slot. The lower cover is provided with a bottom sliding slot. The top sliding slot and the bottom sliding slot are matched with the limited sliding blocks in a sliding manner.

In an embodiment, the push button and the mechanical claws are provided with anti-slip patterns.

Compared with the prior art, the disclosure has the following beneficial effects:

Since the mechanical claws are disposed on two sides of the knife sleeve and two sides of the blade are provided with locking grooves, when the locking blade device is in use, the clamping end heads of the mechanical claws can be clamped into the locking grooves by pushing the push button, and therefore the blade can be locked. Furthermore, the locking blade device of the disclosure can prevent the blade from retracting back into the knife sleeve and shaking during use. Compared with flail knives, straight jump knives, and other knives with retractable blades, the locking blade device of the disclosure can effectively improve the stability of the blade when extended and ensure that the blade will not retract into the knife sleeve during use.

The additional aspects and advantages of the disclosure will be partially provided in the following description, and some of them will be described clearly by the following embodiments.

BRIEF DESCRIPTION OF DRAWINGS

In order to more clearly describe embodiments of the disclosure or technical solutions in the prior art, the following is a brief introduction to the drawings used in the description of the embodiments or the prior art. Obviously, the figures in the following description are only some embodiments of the disclosure. For those of ordinary skill in the art, other figures may also be derived from these figures without creative work.

DESCRIPTION OF REFERENCE NUMERALS

Figure 1:
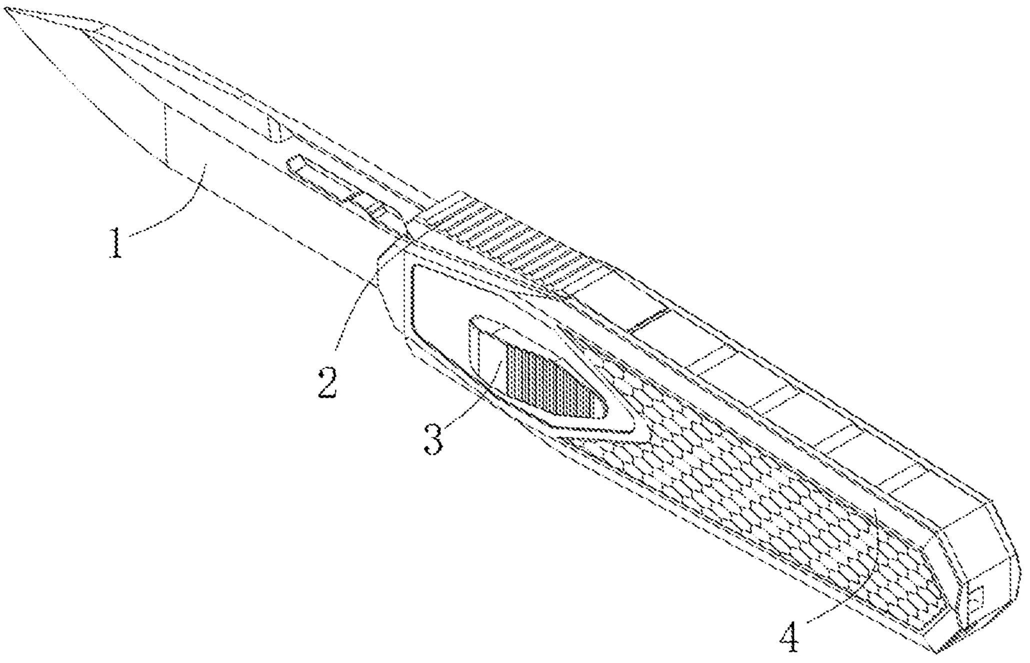
FIG. 1 illustrates a structural schematic view of a locking blade device of the disclosure.

1—blade; 2—mechanical claw; 3—push button; 4—knife sleeve; 5—upper cover; 6—lower cover; 7—push button movable slot; 8—guide plate; 9—fixing frame; 10—bottom sliding slot; 11—limited sliding slot; 12—connecting ear structure; 13—inserting hole; 14—side sliding slot; 15—inclined sliding slot; 16—clamping end head; 17—storage groove; 18—top sliding slot; 19—locking groove; 20—limited sliding block; 21—sliding rod.

DETAILED DESCRIPTION OF EMBODIMENTS

In order to make it easy to understand the technical means, creative features, purpose and effect of the disclosure, the disclosure is further described in combination with the specific embodiments below, but the following embodiments are only some embodiments of the disclosure, not all of them. Other embodiments obtained by those skilled in the art without creative work based on the embodiments should belong to the scope of protection of the disclosure. Implementation methods in the following embodiments are conventional unless otherwise specified. Materials, reagents, and others used in the following embodiments are commercially available unless otherwise specified.

As shown in FIG. 1 to FIG. 6, the disclosure provides a novel locking knife device. The locking knife device includes a knife sleeve 4 and mechanical claws 2 disposed on two sides of an end of the knife sleeve 4. An end of each of the mechanical claws 2 is hinged with the knife sleeve 4. A blade 1 is slidably disposed in the knife sleeve 4. Two sides of the blade 1 are provided with locking grooves 19. The other end of each of the mechanical claws 2 is provided with a clamping end head 16 configured to clamp into a corresponding one of the locking grooves 19, thereby preventing the blade 1 from retracting backing into the knife sleeve 4 and preventing the blade 1 from shaking when the blade 1 is used for cutting operations. A push button 3 is slidably disposed on the knife sleeve 4 and is movably connected to the mechanical claws 2, and the push button 3 is configured to make the clamping end head 16 be clamped into the corresponding one of the locking grooves 19, so that the mechanical claws 2 can be controlled to open and close.

In an embodiment, the knife sleeve 4 includes an upper cover 6, a lower cover 5, and a fixing frame 9 disposed between the upper cover 6 and the lower cover 5. The upper cover 6 is provided with a push button movable slot 7, and the push button movable slot 7 is configured to limit movements of the push button 3.

Figure 2:
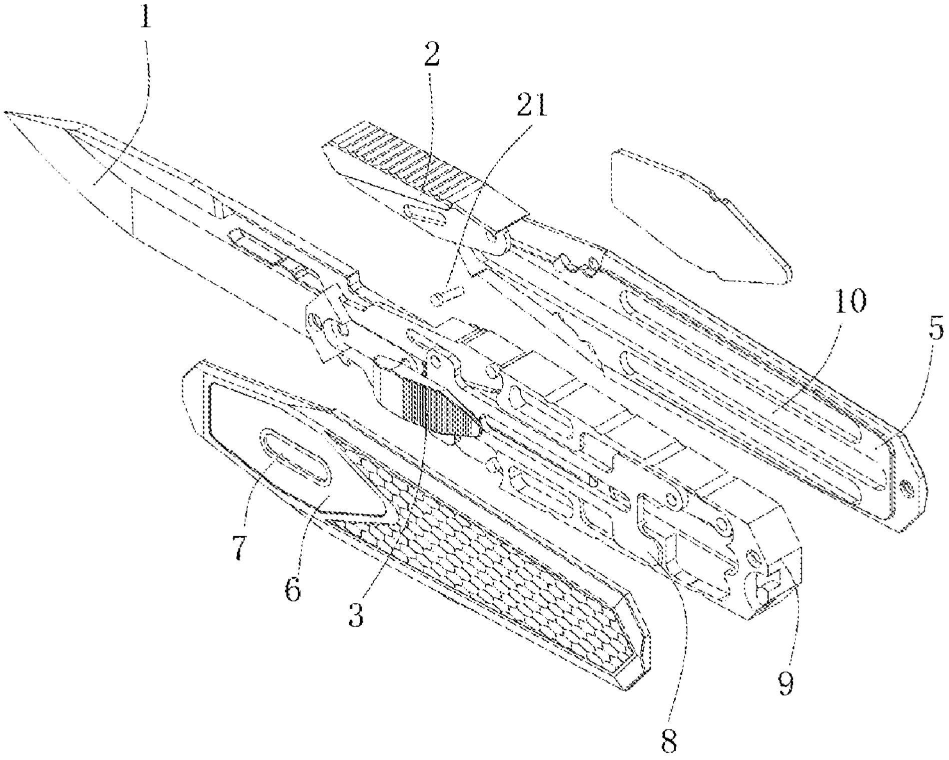
FIG. 2 illustrates an exploded view of a locking blade device of the disclosure.
Figure 3:
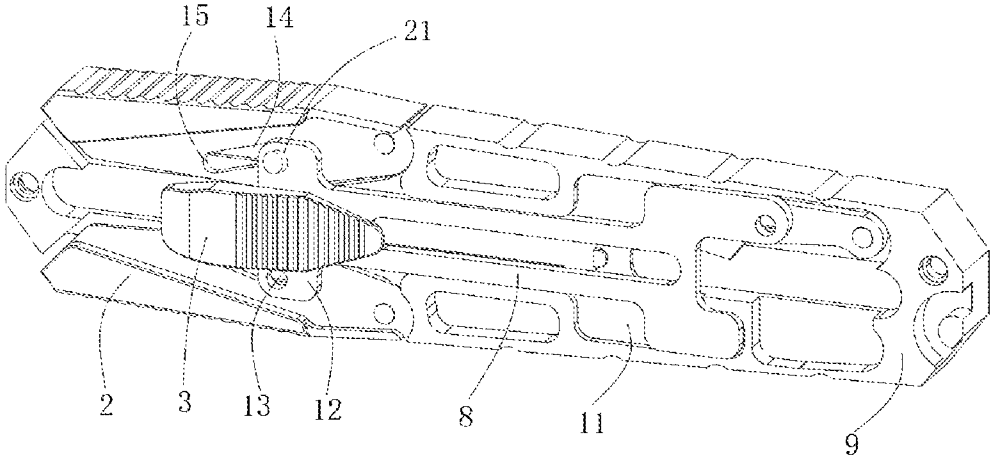
FIG. 3 illustrates a working schematic view of mechanical claws of the disclosure.
Figure 4:
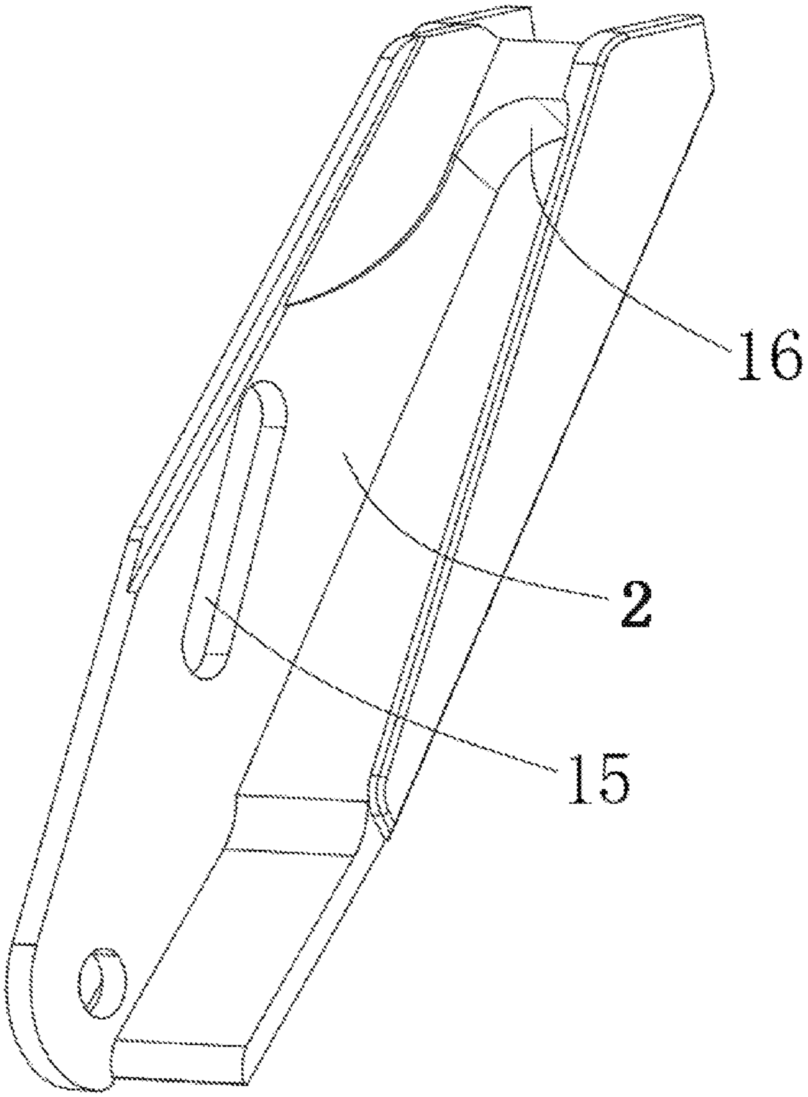
FIG. 4 illustrates a structural schematic view of a mechanical claw of the disclosure.
Figure 5:
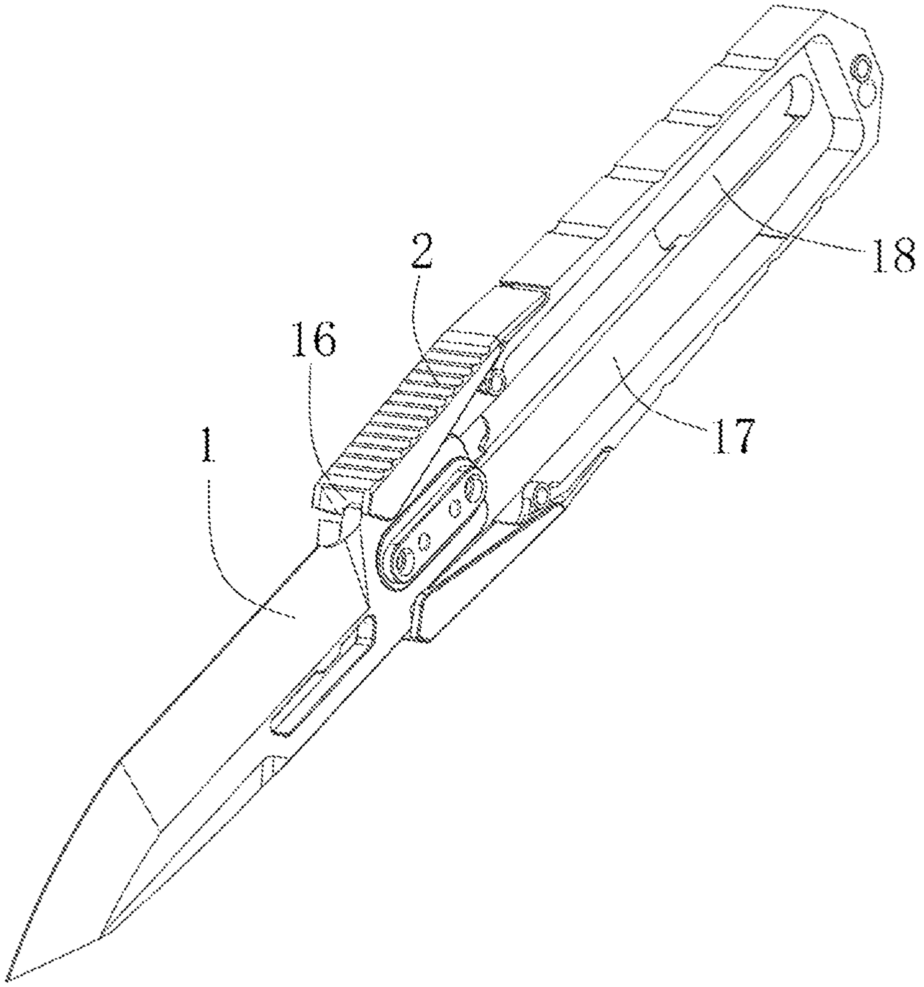
FIG. 5 illustrates an installation diagram of a blade of the disclosure.
Figure 6:
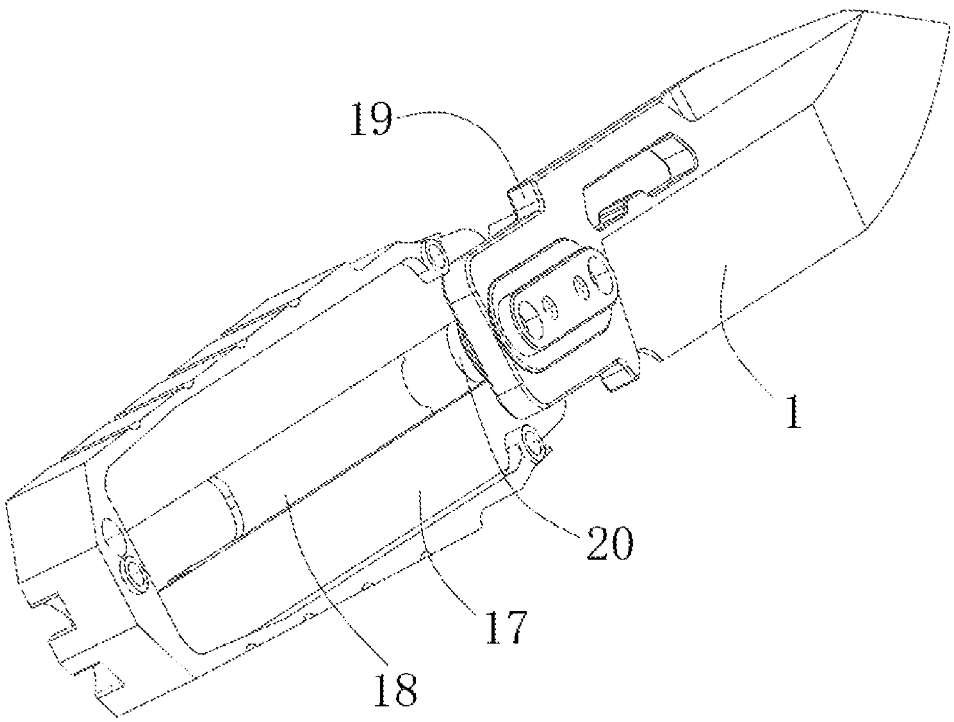
FIG. 6 illustrates another installation diagram of the blade of the disclosure.

In an embodiment, a guide plate 8 is slidably disposed on the fixing frame 9. The push button 3 is fixed at an end of the guide plate 8. A connecting ear structure 12 is provided at the end of the guide plate 8. Side sliding slots 14 are provided on the fixing frame 9 and located below the connecting ear structure 12. The connecting ear structure 12 is provided with inserting holes 13 penetrating the connecting ear structure 12. Sliding rods 21 (FIG. 2 and FIG. 3 show one of the sliding rods to show other parts clearly, and there are two sliding rods 21 actually in the embodiment) are slidably disposed in the side sliding slots 14 respectively. The sliding rods 21 are fixed in the inserting holes 13, respectively. The mechanical claws 2 are provided with inclined sliding slots 15 inclined towards the push button 3. Each of the sliding rods 21 passes through a corresponding one of the inclined sliding slots 15. Each of the sliding rods 21 is slidably connected to the corresponding one of the inclined sliding slots. When the push button 3 is pushed backward, the connecting ear structure 12 slides backward along with the guide plate 8 to drive the sliding rod 21 to slide in a limited manner in the side sliding slots 14, and at the same time, the sliding rods 21 slide towards rear ends of the inclined sliding slots 15 to drive the mechanical claws 2 to tighten, so that the clamping end head 16 is clamped into the locking groove 19 to lock the blade 1.

In an embodiment, a limited sliding slot 11 is provided on the fixing frame 9, and another end of the guide plate 8 is slidably disposed in the limited sliding slot 11, which further limits the sliding of the guide plate 8.

In an embodiment, in order to facilitate the storage of the blade 1 in the blade sleeve 4, a side of the fixing frame 9 facing away from the guide plate 8 is provided with a storage groove 17, and the storage groove 17 is configured to accommodate the blade 1.

In an embodiment, other two sides of the blade 1 are fixedly provided with limited sliding blocks 20. The storage groove 17 is provided with a top sliding slot 18. The lower cover 5 is provided with a bottom sliding slot 10. The top sliding slot 18 and the bottom sliding slot 10 are matched with the limited sliding blocks 20 in a sliding manner (in other words, the top sliding slot 18 is matched with one of the limited sliding blocks 20, and the bottom sliding slot 10 is matched with another limited sliding block 20). Therefore, when the blade 1 retracts back into the blade sleeve 4 or the blade 1 is pushed out from the blade sleeve 4, the blade 1 slides along the same slideway, making it easier for the clamping end heads 16 of the mechanical claw 2 to accurately clamp into the locking groove 19.

In an embodiment, the push button 3 and the mechanical claws 2 are provided with anti-slip patterns.

When the locking blade device of the disclosure is in use, the push button 3 is pushed forward to make the mechanical claws 2 open, then the blade 1 is pushed out from the blade sleeve 4. When the blade 1 is fully extended from the blade sleeve 4 for use, then the push button 3 is pushed backward; at this time, the connecting ear structure 12 of the guide plate 8 slides backward to drive the sliding rods 21 to slide backward in the side sliding slots 14; at the same time, the sliding rods 21 slide toward rear ends of in the inclined sliding slots 15, and each of the mechanical claws 2 is driven to rotate around a hinge connection part (i.e., a connection part where the mechanical claw 2 is hinged with the knife sleeve 4), so that each clamping end head 16 is clamped into a corresponding locking groove 19 to lock the blade 1. When the blade 1 is used, the locking blade device can prevent the blade 1 from retracting into the knife sleeve 4 and prevent the blade 1 from shaking left and right. After using the blade 1, the push button 3 is pushed forward to open the mechanical claws 2 to release the locking state of the blade 1, and the blade 1 can be retracted into the knife sleeve 4.

Since the mechanical claws 2 are disposed on two sides of the knife sleeve 4 and two sides of the blade 1 are provided with locking grooves 19, when the locking blade device is in use, the clamping end heads 16 of the mechanical claws 2 can be clamped into the locking grooves 19 by pushing the push button 3, and therefore the blade 1 can be locked. Furthermore, the locking blade device of the disclosure can prevent the blade 1 from retracting back into the knife sleeve 4 and shaking during use. Compared with flail knives, straight jump knives, and other knives with retractable blades, the locking blade device of the disclosure can effectively improve the stability of the blade 1 when extended and ensure that the blade 1 will not retract into the knife sleeve 4 during use.

In the disclosure, unless expressly stated or limited to the contrary, a first feature is "on" or "under" a second feature means that the first feature directly contacts the second feature or the first feature contacts with the second feature through another feature between them. The first feature is "on", "above", and "upon" the second feature means that the first feature is directly above and diagonally above the second feature, or simply means that the first feature is at a higher height than that of the second feature. The first feature is "under", "below", and "beneath" the second feature means that the first feature is directly below and diagonally below the second feature, or simply means that the first feature is at a lower height than that of the second feature.

The above shows and describes the basic principles, main features, and advantages of the disclosure. Technicians in this industry should understand that the disclosure is not limited by the above embodiments. The above embodiments are only some embodiments of the disclosure and are not intended to limit the disclosure. Without departing from the spirit and scope of the disclosure, there will be various changes and improvements in the disclosure, and these changes and improvements should fall within the scope of the required protection of the disclosure. The scope of protection required by the disclosure is defined by the attached claims and their equivalents.

What is claimed is:

1. A locking blade device, comprising: a knife sleeve (4) and mechanical claws (2) disposed on two sides of an end of the knife sleeve (4);

wherein the knife sleeve (4) comprises a first cover (6), a second cover (5), and a frame (9) disposed between the first cover (6) and the second cover (5); and the first cover (6) is provided with a push button movable slot (7);

wherein an end of each of the mechanical claws (2) is hinged with the frame (9), a blade (1) is disposed on the frame (9), two sides of the blade (1) are provided with locking grooves (19), the other end of each of the mechanical claws (2) is provided with a clamping end head (16) configured to clamp into a corresponding one of the locking grooves (19), a push button (3) is slidably disposed on the first cover (6) and is movably connected to the mechanical claws (2), the push button (3) is configured to make the clamping end head (16) be clamped into the corresponding one of the locking grooves (19), and the push button movable slot (7) is configured to limit movements of the push button (3); and wherein a guide plate (8) is slidably disposed on the frame (9), and the push button (3) is fixed at an end of the guide plate (8); a connecting ear structure (12) is provided at the end of the guide plate (8), side sliding slots (14) are provided on the frame (9) and located below the connecting ear structure (12), and the connecting ear structure (12) is provided with inserting holes (13) penetrating the connecting ear structure (12); sliding rods (21) are slidably disposed in the side sliding slots (14) respectively, and the sliding rods (21) are fixed in the inserting holes (13), respectively; and the mechanical claws (2) are provided with inclined sliding slots (15) inclined towards the push button (3), each of the sliding rods (21) passes through a corresponding one of the inclined sliding slots (15), and each of the sliding rods (21) is slidably connected to the corresponding one of the inclined sliding slots (15).

2. The locking blade device as claimed in claim 1, wherein a limited sliding slot (11) is provided on the frame (9), and another end of the guide plate (8) is slidably disposed in the limited sliding slot (11).

3. The locking blade device as claimed in claim 1, wherein a side of the frame (9) facing away from the guide plate (8) is provided with a storage groove (17), and the storage groove (17) is configured to accommodate the blade (1).

4. The locking blade device as claimed in claim 3, wherein other two sides of the blade (1) are fixedly provided with two limited sliding blocks (20), respectively, the storage groove (17) is provided with a top sliding slot (18), the second cover (5) is provided with a bottom sliding slot (10), and the top sliding slot (18) and the bottom sliding slot (10) are matched with the limited sliding blocks (20) in a sliding manner.

5. The locking blade device as claimed in claim 1, wherein the push button (3) and the mechanical claws (2) are provided with anti-slip patterns.

6. A locking blade device, comprising:

a knife sleeve (4), comprising: a first cover (6), a second cover (5), and a frame (9) disposed between the first cover (6) and the second cover (5);

a blade (1), disposed on the frame (9), wherein two sides of the blade (1) are provided with two locking grooves (19), respectively;

two mechanical claws (2), disposed on two opposite sides of the frame (9), respectively, wherein the two mechanical claws (2) are provided with two clamping end heads (16), respectively;

a guide plate (8), slidably disposed on the frame (9);

a push button (3), fixed on the guide plate (8); and a connecting ear structure (12), connected to the guide plate (8) and disposed below the push button (3), wherein the connecting ear structure (12) is provided with two inserting holes (13) penetrating the connecting ear structure (12); two first sliding slots (14) are provided on the the frame (9) and located below the two inserting holes (13); the mechanical claws (2) are provided with two second sliding slots (15) below the two first sliding slots (14); two sliding rods (21) are respectively connected to the two inserting holes (13), and respectively pass through the two first sliding slots (14) to connect to the two second sliding slots (15);

wherein the push button (3) is configured to, when the push button (3) is pushed, drive the connecting ear structure (12) to slide to make the two sliding rods (21) slide in the two first sliding slots (14) and the two second sliding slots (15) to thus drive the two mechanical claws (2) to tighten, to thereby make the two clamping end heads (16) be clamped into the two locking grooves (19).

* * * * *